United States Patent [19]

Paros et al.

[11] Patent Number: 4,706,259
[45] Date of Patent: Nov. 10, 1987

[54] MOUNTING AND ISOLATION SYSTEM FOR TUNING FORK TEMPERATURE SENSOR

[75] Inventors: Jerome M. Paros, Kirkland; Jeffrey F. Tonn, Tacoma; Richard B. Wearn, Jr., Seattle, all of Wash.

[73] Assignee: Sundstrand Data Control, Inc., Redmond, Wash.

[21] Appl. No.: 815,352

[22] Filed: Dec. 30, 1985

[51] Int. Cl.[4] ............................................. G01K 11/22
[52] U.S. Cl. ..................................... 374/117; 337/321
[58] Field of Search ....................... 374/117; 337/156; 310/25, 321

[56] References Cited

U.S. PATENT DOCUMENTS

| | | | |
|---|---|---|---|
| 3,024,429 | 3/1962 | Cavalieri, Jr. et al. | 331/156 X |
| 3,350,942 | 11/1967 | Peltola | 374/119 |
| 3,386,282 | 6/1968 | Jacobson | 374/117 X |
| 3,470,400 | 9/1969 | Weisbord | 310/15 |
| 3,479,536 | 11/1969 | Norris | 310/8.5 |
| 3,480,809 | 11/1969 | Grib | 310/25 |
| 3,487,690 | 1/1970 | Bell et al. | 374/117 |
| 3,659,230 | 4/1972 | Tanaka et al. | 333/71 |
| 3,683,213 | 8/1972 | Staudte | 310/9.6 |
| 3,986,150 | 10/1976 | Tanaka et al. | 310/8.6 X |
| 4,299,122 | 11/1981 | Ueda et al. | 73/862.59 |
| 4,321,500 | 3/1982 | Paros et al. | 310/321 |
| 4,328,442 | 5/1982 | Tanaka et al. | 310/321 |
| 4,349,881 | 9/1982 | November et al. | 374/117 X |
| 4,372,173 | 2/1983 | EerNisse et al. | 73/862.59 |
| 4,384,495 | 5/1983 | Paros | 73/862.59 |
| 4,437,773 | 3/1984 | Dinger et al. | 374/117 |
| 4,472,655 | 9/1984 | Kawashima | 374/117 X |
| 4,483,630 | 10/1984 | Varela | 374/117 |
| 4,592,663 | 6/1986 | EerNisse et al. | 374/117 |

OTHER PUBLICATIONS

John Chatillon & Sons advertisement-1 page, NY, NY Since 1835, "Iso-Elastic Tuning Forks" with temperature compensation.

Primary Examiner—Daniel M. Yasich
Attorney, Agent, or Firm—Christensen, O'Connor, Johnson & Kindness

[57] ABSTRACT

Prior mounting systems for tuning fork temperature sensors have resulted in unpredictable activity dips within the sensor operating ranges. This problem is eliminated by the mounting and isolation system (32) of the present invention that is adapted to mount temperature sensitive tuning fork (20) to a support structure. The mounting system comprises a mounting member (34) adapted for rigid connection to the support structure, and support means (36) connecting the tuning fork base to the mounting member such that the tuning fork is supported solely by the support means. The support means comprises a low pass mechanical filter that transmits only vibration frequencies that are less than the operating range of frequencies of the tuning fork.

5 Claims, 5 Drawing Figures

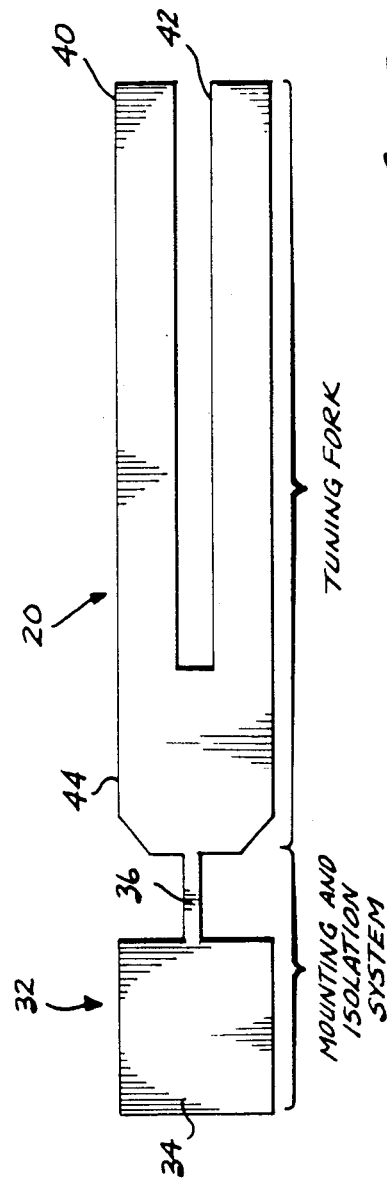
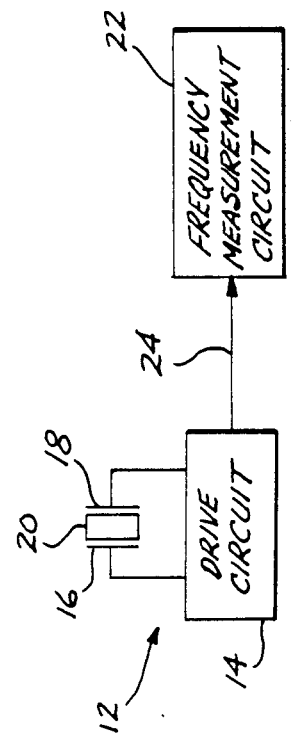

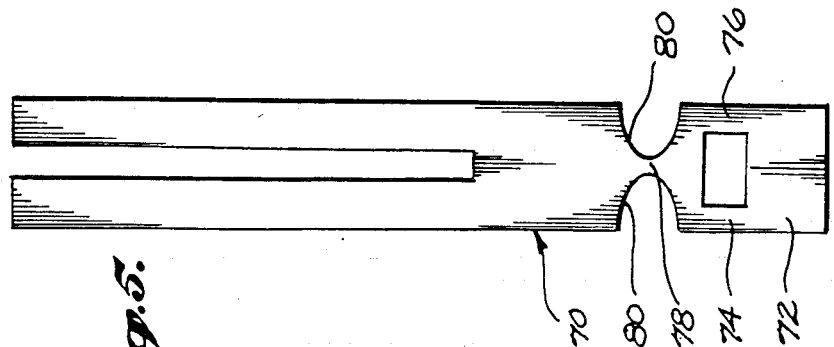
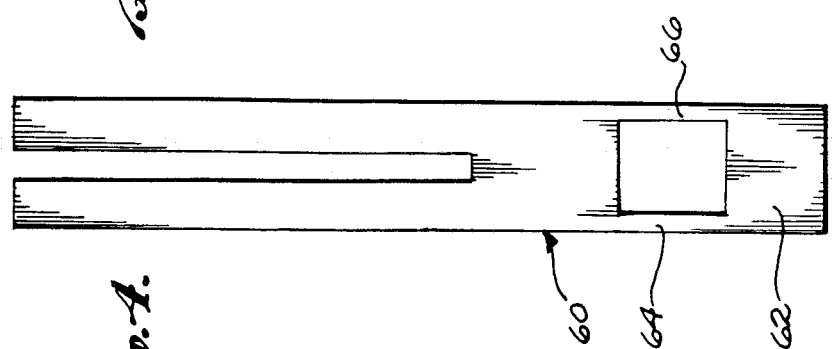
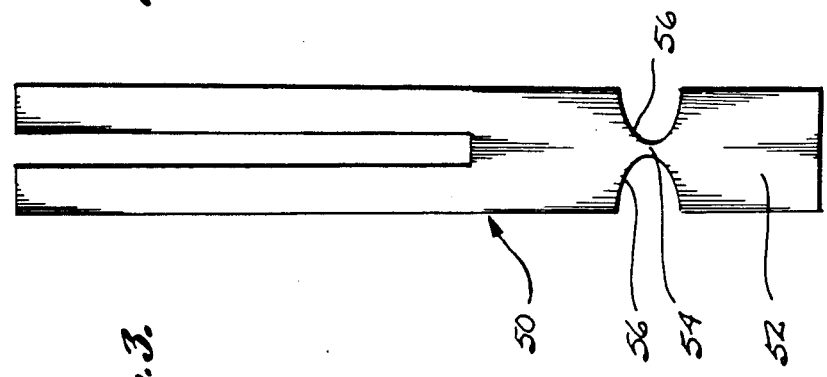

MOUNTING AND ISOLATION SYSTEM FOR TUNING FORK TEMPERATURE SENSOR

TECHNICAL FIELD

The present invention relates to systems for measuring temperature by measuring the oscillation frequency of a tuning fork and, in particular, to a system for mounting the tuning fork such that discontinuities do not occur over the frequency range of interest.

BACKGROUND OF THE INVENTION

It is known that a tuning fork coupled to a suitable drive circuit will resonate at a frequency that is a function of the tuning fork temperature. An oscillator comprising the tuning fork and drive circuit can therefore be used to measure the temperature of the environment in which the tuning fork is located. In one well-known tuning fork temperature sensor, the tuning fork base is secured to a supporting structure, and a tuning fork tines vibrate torsionally or flexurally about their longitudinal axis. Examples may be found in U.S. Pat. Nos. 4,437,773 and 4,472,655. As the temperature of the tuning fork varies, the frequency of oscillation varies over a predetermined operating range. This behavior differs from tuning fork frequency standards that are designed specifically to be insensitive to temperature and operate at a single frequency.

Although a sensor based on a tuning fork oscillator is capable of providing very accurate temperature measurements, there are a number of problems with such sensors that to date have limited their usefulness. In particular, tuning fork temperature sensors often exhibit significant and generally unpredictable nonlinearities and discontinuities at particular temperatures or frequencies within their intended operating ranges. Such nonlinearities and discontinuities are commonly referred to as activity dips. In the past, the cause of activity dips has remained speculative, and no effective techniques have been provided for their elimination. As a result, each tuning fork to be used in a temperature sensor had to be individually checked to determine whether any activity dips occurred within the intended operating range. If such activity dips did occur, the tuning fork was discarded. Such screening procedures are extremely inefficient and costly, and the need to use such procedures has significantly inhibited the application of tuning fork temperature sensor techniques. This problem does not occur in frequency standard tuning fork oscillators which only operate at a single frequency.

SUMMARY OF THE INVENTION

The present invention is based upon the discovery that much of the unpredictable and nonlinear behavior of tuning fork oscillators is due to variations in the way that the tuning forks are mounted, i.e., to variations in the way that the tuning fork bases are attached to a support structure. In a conventional mounting technique, the base of a tuning fork serves two distinct functions—it connects the tines, forming part of the resonating structure, and also serves as an attachment point for mounting the tuning fork. The mechanical vibrational properties of the base are thereby dependent on the size and shape of the base area bonded to the support structure. Since it is difficult to control the exact characteristics of the attachment between the tuning fork base and the support structure, the resonant frequencies of the base are unpredictable, and occur within the intended operating range of the tuning fork oscillator in a significant number of cases. When a base resonant frquency is within the operating range, energy can be efficiently transferred to the base when the vibration frequency of tines approaches the base resonance frequency, thereby causing unpredictable behavior and destroying the usefulness of the sensor at frequencies near the base resonance frequency.

The present invention solves the aforementioned problem by interposing a mounting and isolation system between the tuning fork and the support structure to which the tuning fork is mounted. The mounting and isolation system has two principal characteristics: it supports the tuning fork against movement in any direction, and it attenuates vibration frequencies above a selected cutoff frequency, the cutoff frequency being adjusted such that it is less than the lowest frequency within the operating range of the tuning fork temperature sensor. As a result of this arrangement, the energy transfer from the tuning fork to the support structure is diminished because the mounting and isolation system does not efficiently transmit vibrational energy at frequencies within the tuning fork operating range. High frequency vibration occurring in the support structure likewise will not be transmitted to the tuning fork. Although the mounting and isolation system does transmit low frequency vibrations, e.g., large scale translation and rotational motion of the support structure and low range acoustic vibrations, these frequencies are not in the operating range of the tuning fork oscillator, and therefore do not affect the performance of the temperature sensor.

The cutoff frequency of the low pass mechanical filter may be selected based upon consideration of the fact that for an undamped vibrational isolation system, the energy transfer or transmissibility is given by the following equation:

$$\text{Transmissibility} = \frac{1}{1 - \left(\frac{f_R}{f_I}\right)^2} \quad (1)$$

where $f_R$ is the resonant frequency of the tuning fork oscillator and $f_I$ is the resonant frequency of the isolating. Thus very large amounts of energy are transmitted if the frequency of the tuning fork oscillator equals the resonant frequency of the base. However if the isolation system frequency were one-tenth of the tuning fork frequency then only one percent of the energy would be transmitted.

The mounting and isolation system of the present invention supports the tuning fork at its base. This is in contrast to prior mounting systems for vibrating beams such as those utilized in vibrating beam accelerometers. The vibrating beam of such an accelerometer is typically mounted by flexure hinges at both ends of the vibrating beam, each flexure hinge being adapted to permit transverse motion of one direction but to provide rigidity in the other transverse direction. The mounting system of the present invention is limited to attachment at one end (i.e., the base) of a tuning fork, and therefore must rigidly support the tuning fork against all transverse motion.

BRIEF DESCRIPTION OF THE DRAWINGS

FIG. 1 is a block diagram of a temperature sensor based on a quartz crystal oscillator;

FIG. 2 is a plan view of a tuning fork and associated mounting system according to the present invention;

FIG. 3 is a plan view of a tuning fork and a second embodiment of the mounting system;

FIG. 4 is a plan view of a tuning fork and a third embodiment of the mounting system; and FIG. 5 is a plan view of a tuning fork and a fourth embodiment of the mounting system.

DETAILED DESCRIPTION OF THE DRAWINGS

The mounting and isolation system of the present invention may be used for tuning forks that are composed of a metal, a piezoelectric material such as quartz, or any other suitable elastic material. The tuning forks can be driven into torsional or flexural oscillation by any means that are appropriate for the particular tuning fork material selected. To simplify the description, the present invention will be illustrated with reference to quartz tuning forks that are driven through electrodes deposited on the tuning fork surfaces. FIG. 1 presents a block diagram of a temperature sensor based on such a tuning fork. The sensor comprises oscillator 12 that includes drive circuit 14 and quartz tuning fork 20. Tuning fork 20 is coupled to drive circuit 14 by means of electrodes 16 and 18 positioned on the surface of the tuning fork. Different techniques for positioning electrodes 16 and 18 on tuning fork 20 are well known and are not illustrated in the figures. Oscillator 12 produces an output signal on line 24 that has a frequency corresponding to the temperature of tuning fork 20. Frequency measurement circuit 22 measures the frequency of the signal on line 24 and converts the frequency to a temperature according to known characteristics of the tuning fork.

FIG. 2 illustrates one preferred embodiment of tuning fork 20 and its associated mounting and isolation system. The tuning fork comprises tines 40 and 42 joined by base 44. The dimensions of base 44 are chosen so that the base does not have any vibrational resonances near the frequencies of the vibrating tines 40 and 42. Mounting and isolation system 32 for tuning fork 20 comprises mounting pad 34 and a support structure comprising beam 36. The mounting pad, beam, and tuning fork are preferably integrally formed from a single piece of material such as crystalline quartz. Beam 36 extends from the side of base 44 opposite tines 40 and 42. The other end of beam 36 is contiguous with mounting pad 34. Electrodes 16 and 18 (not shown in FIG. 2) are positioned on the surfaces of tines 40 and 42, each electrode including a portion that extends from tuning fork 20 through beam 36 to mounting pad 34. The extended portion of the electrodes on mounting pad 34 are in turn connected by any suitable means to drive circuit 14. The combined tuning fork/mounting and isolation system is mounted to an external support not illustrated only at mounting pad 34, such that tuning fork 20 is supported only by beam 36. The external support does not form a part of the present invention, and may comprise any object to which the mounting pad can be secured. As a result, oscillation of tuning fork 20 is essentially independent of the details of the connection between the mounting pad and the external support.

The dimensions of mounting pad 34 are essentially arbitrary, and may be selected based upon the size and nature of the external support to which the mounting pad is attached. The dimensions of tuning fork 20 are selected based on conventional considerations of sensitivity, linearity, mode of oscillation, operating temperature range, and tuning fork material. Once the tuning fork dimensions are specified, the dimensions of beam 36 are then selected based on two criteria: the beam must be stiff enough to support the tuning fork against all anticipated vibration or acceleration forces that will be experienced by the temperature sensor in its intended application; and the beam 36 must be dimensioned such that it operates as a low pass mechanical filter for vibrations between mounting pad 34 and tuning fork 20. The cutoff frequency of the low pass mechanical filter is selected to be below the lower limit of the operating range of the tuning fork oscillator. In particular beam 36 is designed such that at the lowest frequency within the operating range, the transmissibility as given by equation (1) is sufficiently small to effectively isolate the tuning fork from the mounting pad. The determination of the fibration transmission characteristics of beam 36 may be carried out by any well known structural analysis technique, such as finite element analysis. The particular dimensions selected for a particular temperature sensor will, of course, depend upon the operating range of that temperature sensor and the system and environment in which the temperature sensor will be used.

FIGS. 3-5 illustrate alternate means for mounting the tuning fork according to the present invention. In FIG. 3, tuning fork 50 is connected to mounting pad 52 through a support structure comprising beam 54. Beam 54 is similar to beam 36 of FIG. 2, except that beam 54 includes circular edges 56 in place of the rectangular edges of beam 36, beam 54 in effect comprising a necked down flexure hinge. In FIG. 4, tuning fork 60 is connected to mounting pad 62 through a support structure comprising beams 64 and 66. The embodiment of FIG. 4 provides greater rotational stability than single beam embodiments of FIGS. 2 and 3, and may therefore be preferable in tuning fork temperature sensors in which the beam width is appreciably less than the beam length. FIG. 5 illustrates tuning fork 70 joined to mounting pad 72 through a support structure comprising beams 74, 76 and 78. Beam 78 includes inwardly curved edges 80 that are analogous to edges 56 of FIG. 3.

While the preferred embodiments have been illustrated and described, it is to be understood that variations will be apparent to those skilled in the art. Accordingly, the invention is not to be limited to the specific embodiments illustrated and described, and the true scope and spirit of the invention are to be determined by reference to the appended claims.

The embodiments of the invention in which an exclusive property or privilege is claimed are defined as follows:

1. A mounting and isolation system for a tuning fork temperature sensor that includes a tuning fork having a frequency of oscillation that is a function of temperature, the mounting and isolation system comprising a mounting member having a surface shaped so as to permit the mounting member to be rigidly connected to an external support, and an elongated support structure connecting a selected point on the tuning fork to the mounting member such that the tuning fork is supported solely by the support structure, the dimensions of the support structure selected so as to comprise a low pass mechanical filter that is adapted to transmit only vibration frequencies that are less than the operating range of frequencies of the tuning fork.

2. The mounting and isolation system of claim 1, wherein the support structure comprises a single beam.

3. The mounting and isolation system of claim 1, wherein the support structure comprises a variable width beam formed by a pair of back-to-back arcuate recesses.

4. The mounting and isolation system of claim 1, wherein the support structure comprises two spaced apart beams.

5. The mounting and isolation system of claim 1, wherein the tuning fork, mounting member and support structure are fabricated from a single wafer of crystalline quartz.

* * * * *